US012353368B2

(12) United States Patent
Kumar et al.

(10) Patent No.: US 12,353,368 B2
(45) Date of Patent: Jul. 8, 2025

(54) APPLICATION INFRASTRUCTURE FOR MAINTAINING PRODUCTION AND NON-PRODUCTION ENVIRONMENTS USING A SEGREGATED SCHEMA

(71) Applicant: Express Scripts Strategic Development, Inc., St. Louis, MO (US)

(72) Inventors: Ghanshyam Kumar, Orlando, FL (US); Anith Larson, Lakeland, TN (US); Velchakravarthi Sadasivam, Austin, TX (US); Senthan Amudan Arumugam, Orlando, FL (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 113 days.

(21) Appl. No.: 18/083,839

(22) Filed: Dec. 19, 2022

(65) Prior Publication Data
US 2024/0202169 A1 Jun. 20, 2024

(51) Int. Cl.
*G06F 16/21* (2019.01)
*G06F 8/65* (2018.01)

(52) U.S. Cl.
CPC .............. *G06F 16/213* (2019.01); *G06F 8/65* (2013.01)

(58) Field of Classification Search
CPC ................................. G06F 16/213; G06F 8/65
See application file for complete search history.

(56) References Cited

U.S. PATENT DOCUMENTS

| 7,296,297 | B2 | 11/2007 | Kirkpatrick |
| 7,454,435 | B2 | 11/2008 | Friedman |
| 7,941,460 | B2 | 5/2011 | Bar-Or |
| 9,251,225 | B2 | 2/2016 | Stanfill |
| 9,535,951 | B2 | 1/2017 | Brown |
| 9,756,001 | B2 | 9/2017 | Singh |
| 10,108,533 | B1 * | 10/2018 | Parasuraman ............ G06F 8/60 |
| 10,268,742 | B2 | 4/2019 | Adya |
| 10,970,270 | B2 | 4/2021 | Raman |
| 2005/0091346 | A1 | 4/2005 | Krishnaswami |
| 2006/0130048 | A1 | 6/2006 | Ho |
| 2007/0136819 | A1 * | 6/2007 | Ng ........................ H04L 63/08 726/27 |
| 2007/0239570 | A1 * | 10/2007 | Kam-Chak Cheng ....................... G06Q 10/10 705/35 |
| 2017/0329390 | A1 * | 11/2017 | Shah ..................... G06F 9/4418 |

* cited by examiner

*Primary Examiner* — Kannan Shanmugasundaram
(74) *Attorney, Agent, or Firm* — Harness IP

(57) ABSTRACT

A computer system includes a database configured to store a first rule schema, a second rule schema and a data schema, the first and second rule schemas each configured to store a compiled code base, and the data schema configured to store transactional data. The system includes a user application node configured to allow users to perform application operations, and a developer application node configured to facilitate developer deployment operations. Processor hardware is configured to point the user application node to the first rule schema, point the developer application node to the second rule schema, point the user application node and the developer application node to the data schema, update the second rule schema according to updates received via the developer application node, and in response to validation of the updates to the second rule schema, change the user application node to point to the updated second rule schema.

9 Claims, 9 Drawing Sheets

APPLICATION INFRASTRUCTURE FOR MAINTAINING PRODUCTION AND NON-PRODUCTION ENVIRONMENTS USING A SEGREGATED SCHEMA

FIELD

The present disclosure relates to application infrastructures for maintaining production and non-production environments using a segregated schema.

BACKGROUND

Code deployment and business validation in some systems, such as PEGA based business process management (BPM) systems, may require downtime of a user application for hours or longer, waiting for the system to perform deployment and business validation. This typically requires information technology deployment to occur during off hours when the user application has lower usage.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer system includes a database configured to store a first rule schema, a second rule schema and a data schema, the first rule schema configured to store a compiled code base, the second rule schema configured to store the compiled code base, and the data schema configured to store transactional data, a user application node configured to allow users to perform application operations. The system includes a developer application node configured to facilitate developer deployment operations. The processor hardware is configured to execute instructions to point the user application node to the first rule schema, point the developer application node to the second rule schema, point the user application node and the developer application node to the data schema, update the second rule schema according to updates received via the developer application node, and in response to validation of the updates to the second rule schema, change the user application node to point to the updated second rule schema.

In other features, the processor hardware is configured to perform an update check to determine whether the developer deployment operations have finished updating the second rule schema, and perform a validation check in response to a determination that the developer deployment has finished updating the second rule schema. In other features, the processor hardware is configured to modify the second rule schema based on the received updates, without modifying the first rule schema.

In other features, the processor hardware is configured to, in response to validation of the updates to the second rule schema, generate a third rule schema which is a copy of the updated second rule schema, for further development of the third rule schema by the developer application node. In other features, changing the user application node to point to the updated second rule schema includes changing an extensible markup language (XML) configuration file which previously linked the user application node to the first rule schema.

In other features, the database, the user application node and the developer application node comprise a PEGA business process management (BPM) system. In other features, the first rule schema and the second rule schema comprise a segregated split schema of the BPM system, and the user application node and the developer application node each point to the same data schema storing the transactional data.

In other features, the first rule schema, the second rule schema and the data schema are stored in a same ORACLE cluster of the database. In other features, the system includes a first load balancer connected between a user application interface and the user application node, and a second load balancer connected between a developer application interface and the developer application node. In other features, the user application node includes a first web user node, a first batch node and a first stream node, and the developer application node includes a second web user node, a second batch node and a second stream node.

In other features, a file decryption method includes receiving an encrypted file from an external vendor, the encrypted file including one or more individual records, loading the encrypted file to a secure file transfer protocol (SFTP) drive, accessing the encrypted file, by an application server, using at least one authentication credential, decrypting the encrypted file, by a Linux based Cron job, using at least one certificate, transferring the decrypted file to a specified folder to be accessed by a file listener application, accessing the decrypted file, by the file listener application, to parse the one or more individual records of the decrypted file, performing validation on the parsed one or more individual records, for each of the parsed one or more individual records, transferring the individual record to a securely connected system for further processing, in response to a successful validation, generating a report indicative of processing of the decrypted file, and deleting the decrypted file to avoid a security breach regarding the one or more individual records of the decrypted file.

In other features, the accessing the decrypted file to parse the one or more individual records, transferring each individual record, and generating the report, are performed automatically by the file listener application without manual intervention by a user. In other features, the encrypted file is encrypted with UNIX PGP encryption using a public key and a private key.

In other features, the external vendor is a pharmaceutical records vendor, and the one or more individual records of the encrypted file include payment card data records. In other features, transferring each individual record to the securely connected system for further processing includes transferring the individual record using an OAuth authentication protocol, and data of the one or more records is encrypted while the one or more records is held in queue, to inhibit a user from viewing or modifying the one or more records, and inhibit access to payment card industry (PCI) data of the one or more records.

In other features, the file listener application is deployed on a first application node, and the method further includes deploying a developer environment to a second application node, pointing the first application node to a first rule schema storing a compiled code base, pointing the second application node to a second rule schema storing the compiled code base, and pointing the first application node and the second application node to a data schema configured to store transactional data. In other features, the method further comprises updating the second rule schema according to updates received via the second application node, and in response to validation of the updates to the second rule schema, changing the first application node to point to the updated second rule schema.

In other features, the method further includes performing an update check to determine whether developer deployment operations have finished updating the second rule schema, and performing a validation check in response to a determination that the developer deployment operations have finished updating the second rule schema. In other features, the second rule schema is modified based on the received updates, without modifying the first rule schema. In other features, the method includes, in response to validation of the updates to the second rule schema, generate a third rule schema which is a copy of the updated second rule schema, for further development of the third rule schema by the second application node Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

High-Volume Pharmacy

Figure 1:
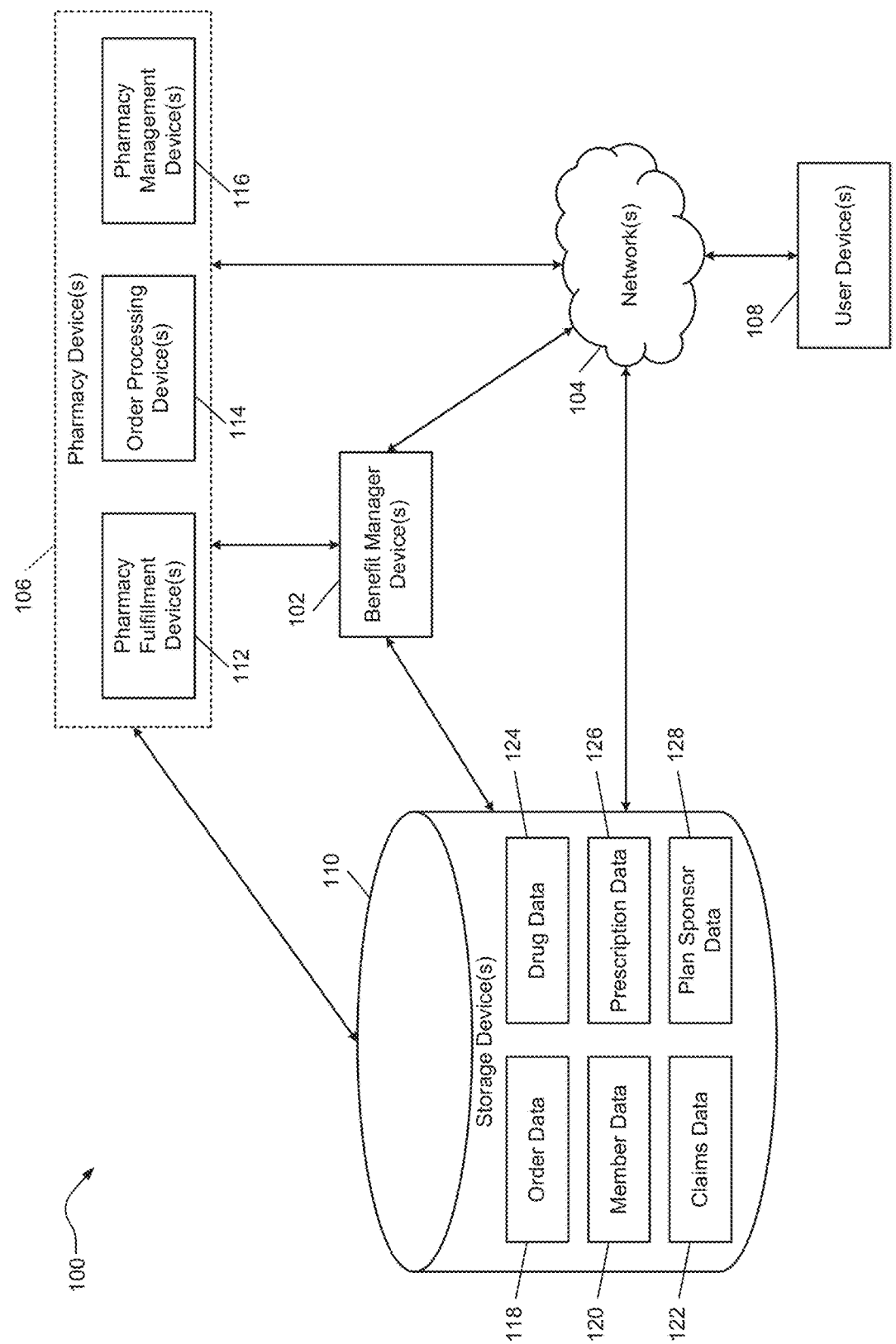
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug is successfully adjudicated. The aforementioned adjudication operations generally occur before the copayment is received and the prescription drug is dispensed. However, in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally, or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy.

Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
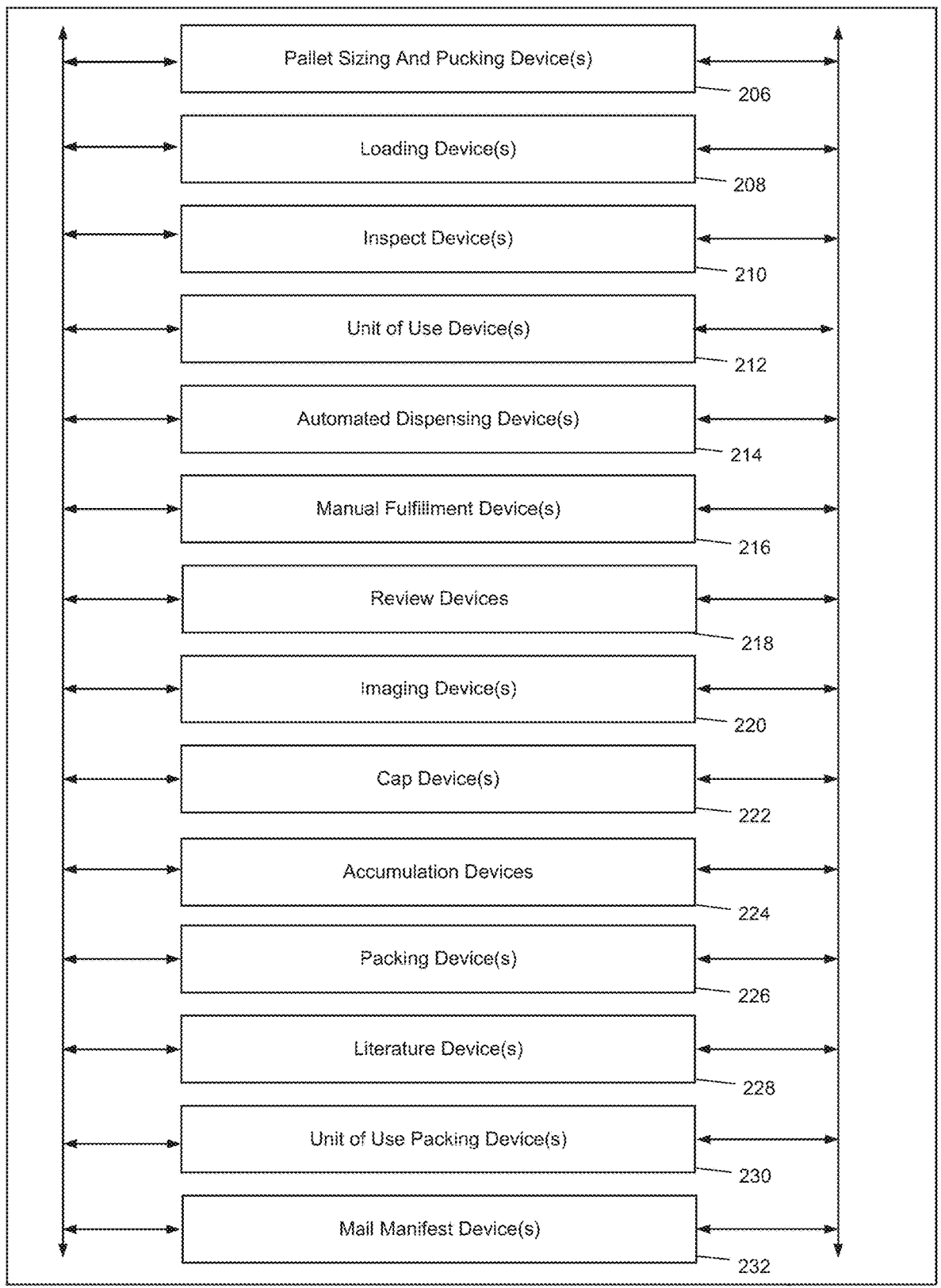
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
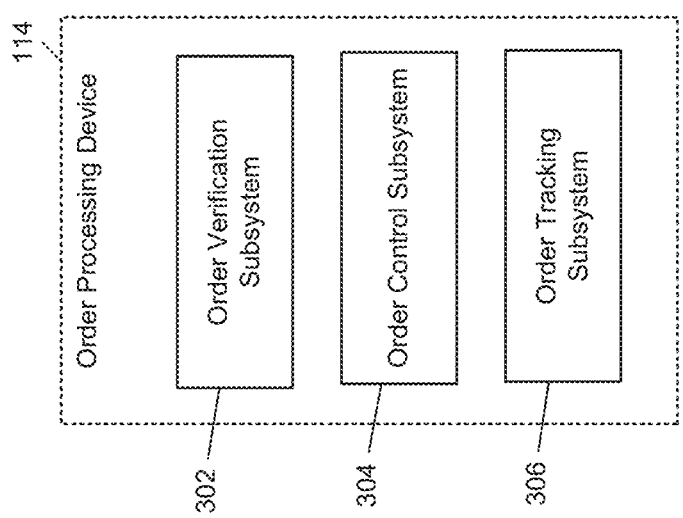
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Production and Non-Production Environment System

Figure 4:
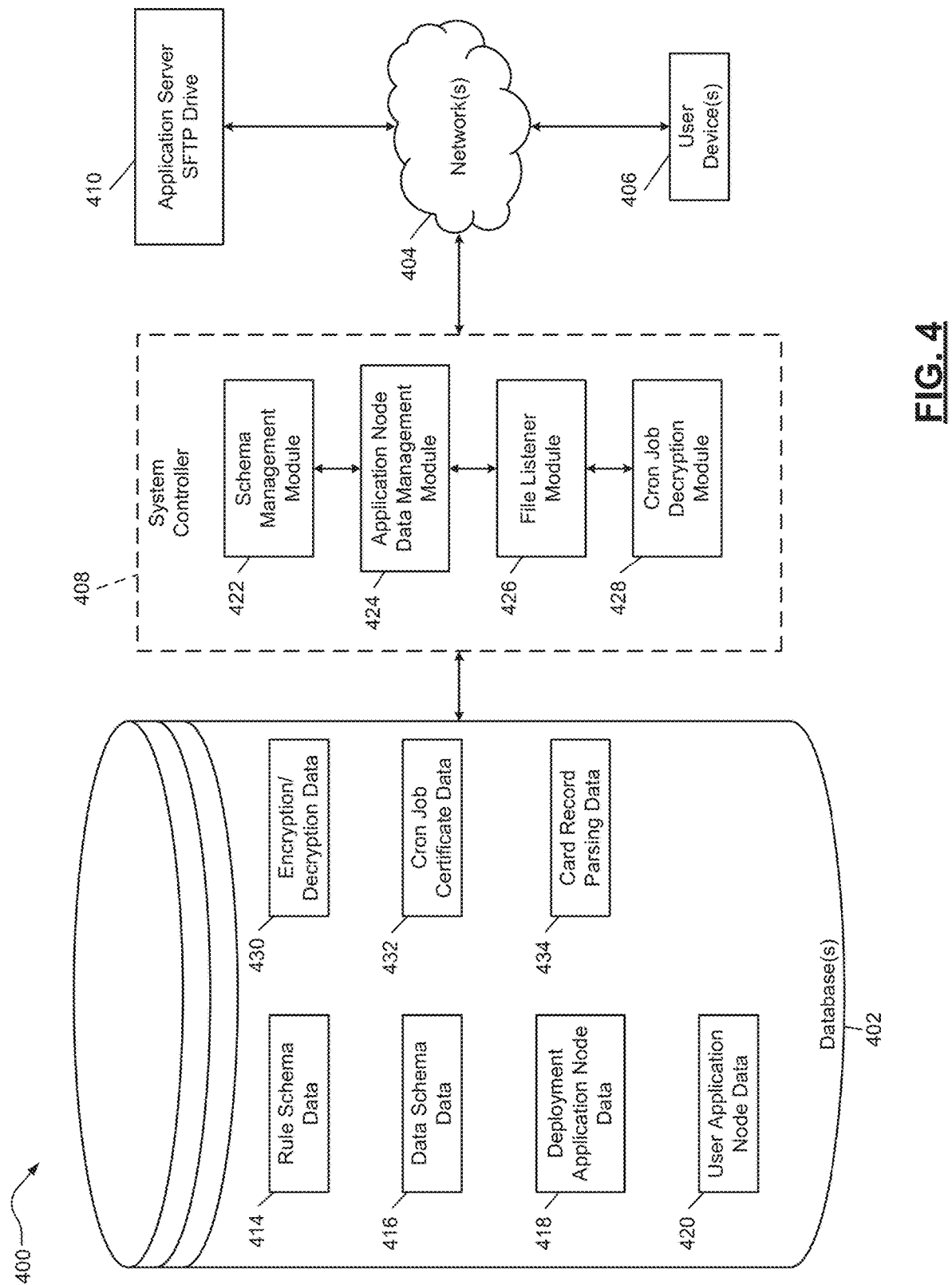
FIG. 4 is a functional block diagram of an example system for maintaining production and non-production environments using a segregated schema.

FIG. 4 is a functional block diagram of an example system 400 for maintaining production and non-production environments using a segregated schema, which includes a database 402. While the system 400 is generally described as being deployed in a computer network system, the database 402 and/or components of the system 400 may otherwise be deployed (for example, as a standalone computer setup). The system 400 may include a desktop computer, a laptop computer, a tablet, a smartphone, etc.

As shown in FIG. 4, the database 402 stores rule schema data 414, data schema data 416, deployment application node data 418, user application node data 420, encryption/decryption data 430, Cron job certificate data 432, and card record parsing data 434. In various implementations, the database 402 may store other types of data as well.

The rule schema data 414, data schema data 416, deployment application node data 418, user application node data 420, encryption/decryption data 430, Cron job certificate data 432, and card record parsing data 434 may be located in different physical memories within the database 402, such as different random access memory (RAM), read-only memory (ROM), a non-volatile hard disk or flash memory, etc. In some implementations, the rule schema data 414, data schema data 416, deployment application node data 418, user application node data 420, encryption/decryption data 430, Cron job certificate data 432, and card record parsing data 434 may be located in the same memory (such as in different address ranges of the same memory). In various implementations, the rule schema data 414, data schema data 416, deployment application node data 418, user application node data 420, encryption/decryption data 430, Cron job certificate data 432, and card record parsing data 434 may each be stored as structured or unstructured data in any suitable type of data store.

The rule schema data 414 may include any suitable data for application processes, database rules, etc., such as one or more compiled code bases. The data schema data 416 may include any suitable schemas for storing data, such as transactional data, payment card records, pharmaceutical records, patient or individual records, etc. The rule schema data 414 and the data schema data 416 may include multiple schemas for operation with any suitable database architectures, such as a PEGA business process management (BPM) system.

The deployment application node data 418 may include any suitable data for applications associated with updating rule schemas, updating code bases, implementing developer deployment and validation operations, developer non-environments, etc. The user application node data 420 may include any suitable data for applications associated with user access to the system, such as user interfaces, user application nodes that access the schemas, etc.

The deployment application node data 418 may be implemented with a deployment application node or non-production environment of any suitable database architectures, such as a PEGA business process management (BPM) system. The deployment application node data 418 may be implemented with a user application node or production environment of any suitable database architectures, such as a PEGA business process management (BPM) system.

The encryption/decryption data 430 may include any suitable data for encrypting and decrypting files, including public and private keys, certificates, etc. Example encryption protocols may include, but are not limited to, UNIX pretty good privacy (PGP) encryption, encryption in a secure file transfer protocol (SFTP) or SSH file transfer protocol, BLOB encryption, etc.

The Cron job certificate data 432 may include any suitable data for implementing a UNIX-based Cron job, such as using certificates to decrypt files with a Cron job. The card record parsing data 434 may include any suitable data for parsing payment card records, such as formats of payment card fields, details of pharmaceutical companies associated with the payment cards, payment card transaction data, individual patient or cardholder data, insurance data, etc.

As shown in FIG. 4, a system controller 408 may include one or more modules, including a schema management module 422, an application node data management module 424, a file listener module 426, and a Cron job decryption module 428. These example modules are provided for purposes of illustration, and other embodiments may include more or less modules, functions of different software features implemented in other modules or controller locations, more than one system controller, more than one database, data distributed to other databases, etc.

The schema management module 422 may be configured to manage rule schemas, data schemas, segregated split data schemas, etc. For example, one rule schema may store a complied code base for a user application node, while another rule schema stores a same copy of the compiled code base for developers to update. A data schema may store transactional data that can be accessed by both a user application node and a developer application node.

The application node data management module 424 may be configured to manage one or more user application nodes for users to access database information in a production environment, one or more developer nodes for developers to update and validate code deployed in a non-production environment, etc. For example, in various implementations, a system developer may access code, rule schemas, etc., for updates and validation, by accessing the system controller 408 via the user device 406. Similarly, a user of an application deployed on an application user node may access the application using a user device 406.

The user device 406 may include any suitable user device for displaying text and receiving input from a user, including a desktop computer, a laptop computer, a tablet, a smartphone, etc. In various implementations, the user device 406 may access the database 402 or the system controller 408 directly, or may access the database 402 or the system controller 408 through one or more networks 404. Example networks may include a wireless network, a local area network (LAN), the Internet, a cellular network, etc.

The file listener module 426 may be configured to listen for decrypted files that are received from an external vendor (such as payment card information from a pharmaceutical or healthcare provider like ACCREDO), and then process the decrypted files. For example, the file listener module 426 may parse records of the decrypted file to validate the records, transfer the records to another system for further processing, generate a report based on processing and validating the records, etc.

The Cron job decryption module 428 may be configured to decrypt files, such as by using a UNIX Cron job to decrypt encrypted files received from the external vendor. As an example, FIG. 4 illustrates an application server SFTP drive 410, which may store encrypted files received from an external vendor. The Cron job decryption module 428 may be configured to decrypt files stored in the application server SFTP drive 410, such as by using certificates and UNIX-based PGP encryption protocols, etc.

Figure 5:
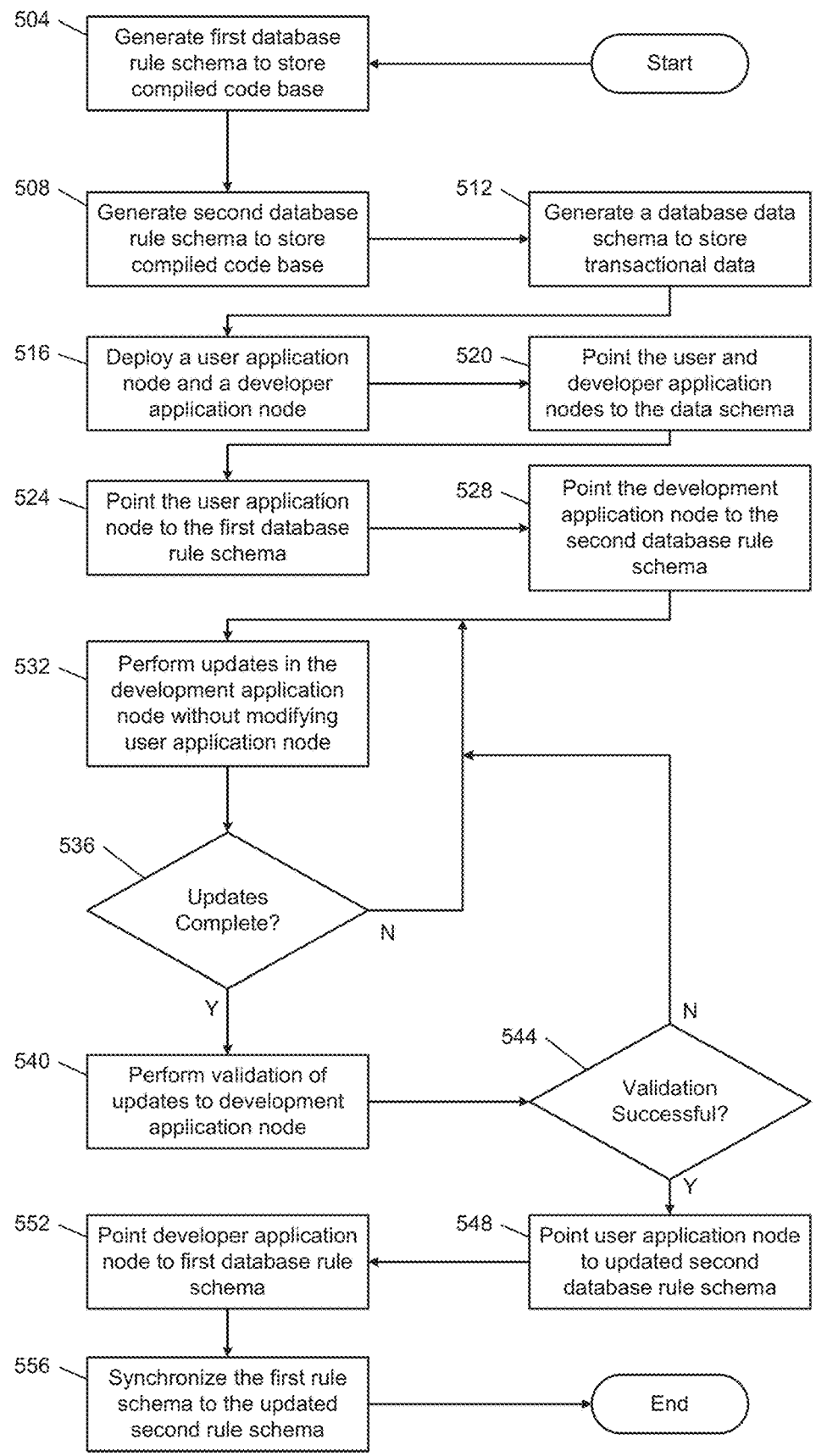
FIG. 5 is a flowchart depicting an example process for maintaining production and non-production environments using a segregated schema.

FIG. 5 is a flowchart depicting an example process for maintaining production and non-production environments using a segregated schema, which may be implemented by, e.g., the system controller 408 of FIG. 4. The process begins at 504 by generating a first database rule schema to store a compile code base.

At 508, control generates a second database rule schema to store a compiled code base (which may be a copy of the compiled code base stored in the first rule schema). Control then generates a database data schema to store transactional data at 512.

At 516, control deploys a user application node and a developer application node. For example, the user application node may allow a user to access database operations in a production environment, while the developer application node allows developers to update, change and validate the code base in a non-production environment.

Control points the user and developer application nodes to the database data schema at 520. For example, both the user application node and the developer application node may be able to access the same transactional data stored in the database data schema.

At 524, control points the user application node to the first database rule schema, and at 528 control points the development application node to the second database rule schema. For example, the user application node and the developer application node may point to same copies of a compiled code base in a rule schema, so developers can modify/update the rule schema without affecting the live user experience of users on the user application node.

At 532, control performs updates in the development application node, without modifying the user application node. For example, because the development application node is pointed to a rule schema that is segregated or split from the rule schema used by the user application node, developers can update the rule schema node without affecting the live production environment experience of the users.

Control determines whether the updates are complete at 536. If not, control returns to 532 to continue updating, e.g., the second rule schema, based on changes provided by the developers. Once the updates are complete at 536, control proceeds to 540 to perform validation of the updates received at the development application node.

For example, validation logic may be applied to determine whether the updates made in the non-production environment are correct, valid, accurate, etc. At 544, control determines whether the validation is successful. If not, control returns to 532 to allow the developers to make further changes and updates using the developer application node.

If control determines at 544 that validation is successful, control proceeds to 548 to point the user application node to an updated second database rule schema. For example, an XML linking configuration file may be modified so the user application node points to the rule schema that has been updated and validated by the developers, so the updated rule schema is now used for the production environment. In various implementations, a copy of the updated rule schema may be generated for the user application node (e.g., so the developer application node can continue making further updates to the second rule schema for further improvements).

At 552, control points the developer application node to the first rule database rule schema (e.g., the 'old' rule schema the user application node was previously linked to). Control then synchronizes the first rule schema to the second rule schema (e.g., the updated second rule schema), at 556.

For example, pointing the developer application node to the first rule schema, and then synchronizing the first rule schema to the updated second rule schema, may allow the developer application node to treat the synchronized first rule schema as a rule schema that may be further modified, without affecting operation of the user application node (which is now linked to the updated second database rule schema). Although FIG. 5 illustrates switching the developer application node to the first rule node and then performing synchronization, in other embodiments the system may make a copy of the updated second database rule schema for modification by the developer application node, etc.

Example embodiments described herein may allow for performance of code deployment and business validation during business hours, for any suitable system (such as a PEGA BPM based application), without affecting the application or users that are live in a production environment. The validation and business as usual processes may be executed in parallel without down time.

For example, some applications may require waiting until off hours to perform deployment and business validation, to avoid impacting users and applications in a live production environment. Off hour deployment may be a standard practice for information technology teams and applications. This may require multiple teams to support deployment in off hours and working overnights (inhibiting those teams from working during business hours), wasting resources, slowing roll out capabilities, impacting turn around time, and inhibiting continuous development and deployment.

In various example embodiments described herein, developer deployment activities may occur during business hours without impacting users or existing applications or work. Product change validation may be supported during business hours using real data (e.g., via a segregated split schema approach), with a capability to fix identified issues, reduce turn around time to get a change or ticket fixed and rolled out, and support continuous development and deployment to production with validation, without waiting for an off hour schedule.

Figure 6:
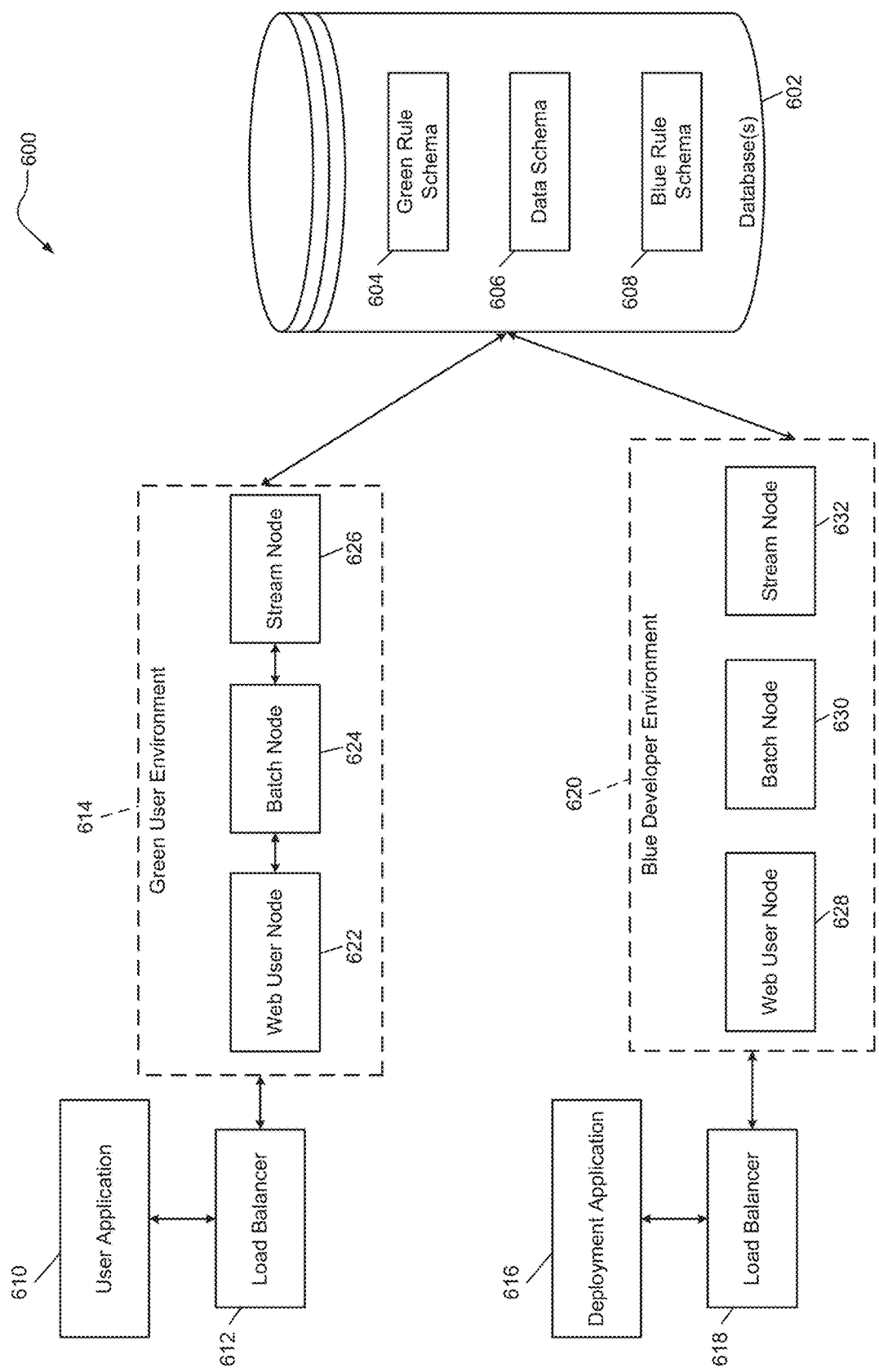
FIG. 6 is a functional block diagram of another example system for maintaining production and non-production environments using a segregated schema.

FIG. 6 is a functional block diagram of an example system 600 for maintaining production and non-production environments using a segregated schema. As shown in FIG. 6, a green user environment 614 and a blue developer environment 620 are each linked with a database 602. In this example, 'green' and 'blue' may refer to production and non-production environments, although they could also be referred to as first and second environments, user application nodes and developer application nodes, etc.

As shown in FIG. 6, the green user environment 614 includes a web user node 622, a batch node 624, and a stream node 626. The user application 610 allows a user to access the green user environment 614, such as though a user interface, etc. A load balancer 612 is connected between the user application 610 and the green user environment 614 (such as an F5 VIP load balancer). The green user environment 614 may be for a regular user to perform day to day operational support, and may not support developer deployment.

The blue developer environment 620 includes a web user node 628, a batch node 630, and a stream node 632. The developer application 616 allows a user to access the blue developer environment 620, such as though a developer application user interface, etc. A load balancer 618 is connected between the developer application 616 and the blue developer environment 620. The blue developer environment 620 may be an application node dedicated for deployment and business validation, which is not for a regular user to perform day to day operational work.

As shown in FIG. 6, the database 602 (such as a PEGA BPM system database) includes a green rule schema 604, a data schema 606, and a blue rule schema 608. The green rule schema 604 and the blue rule schema 608 may initially include copies of a same code base, before the blue rule schema 608 is updated by the blue developer environment 620. The data schema 606 may store transactional data, or any other suitable data.

By using a split schema concept, different applications (such as different PEGA BPM applications) may use different code bases, while connecting with the same transactional data. For example, the applications of the green user environment 614 may be linked with the green rule schema 604, while the blue developer environment 620 is linked with the blue rule schema 608. The green user environment 614 and the blue developer environment 620 may be linked with the same data schema 606, to access the same transactional data.

After completing validation of any changes made to the blue rule schema 608 by the blue developer environment 620, the green user environment 614 may be linked to the updated blue rule schema 608. The updated blue rule schema 608 may then be treated as 'old' code by the blue developer environment 620, to implement further changes and updates in the future. In some example embodiments, a separate copy of the updated blue rule schema 608 may be generated, so the blue developer environment 620 can make further changes to the updated rule schema without affecting the rule schema used by the green user environment 614.

Schema linking may be performed in any suitable manner, such as via a context XML configuration file. The file may be changed in order to point the green user environment 614 to the updated blue rule schema. Example pseudocode for an example context.xml file for including a new schema for blue-green deployment is provided below:

```
//
    <Resource name="jdbc/PegaRULES"
    auth="Container"
    type="javax.sql.DataSource"
    maxTotal="100"
    maxIdle="30"
    maxWaitMillis="10000"
    driverClassName="*************"
    url="jdbc:***************"
    username="********"
    password="********"/>
    <Environment
name="prconfig/database/databases/PegaRULES/defaultSchema"
value="rules"
type="java.lang.String" />
    <Environment
name="prconfig/database/databases/PegaDATA/defaultSchema"
value="data"
type="java.lang.String" />
    //
```

Figure 7:
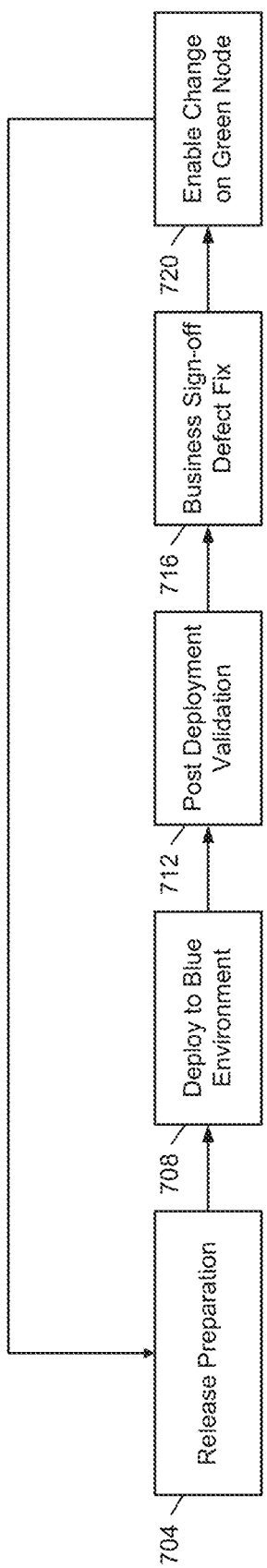
FIG. 7 is a flow chart depicting an example process for implementing changes to a user application node.

FIG. 7 is a flow chart depicting an example process for implementing changes to a user application node. At 704, control prepares a new release, such as a new application or rule schema intended to be released to users. At 708, the prepared new release is deployed to a blue environment, such as the blue developer environment 620 of FIG. 6.

At 712, control performs post deployment validation. For example, one or more validation logic rules may be checked against the release that was deployed to the blue developer environment. At 716, control receives a business sign-off on a defect fix. For example, a system administrator, automated validation logic routine, etc., may check to confirm that a defect has been corrected properly. Control then enables the change on a green node (such the green user environment 614 of FIG. 6), at 720.

Example embodiments described herein may use application infrastructure, with an additional application node as a blue node environment. In various implementations, separate uniform resource locator (URL) addresses, such as F5 URLs, may be used for environment access and keeping nodes separated.

Different database schemas may be implemented in a same cluster, such as a same ORACLE cluster. Infrastructure architecture may be scaled to support changes for node and schema separation. In some example embodiments, multiple clusters could be used, which may not include changes to a context.xml configuration file, may be configured by, e.g., F5, etc. A node status table may be used to keep track of which nodes are active, including IP addresses, etc.

File Decryption Processes

Some example embodiments herein provide end to end secure and automated processing of records, such as credit card information. For example, patient access and revenue cycle management (PARCM) users, such as business users or administrators, may be in need of automated periodic processing of records, such as monthly processing of credit card files to get payment method information.

An example is an OPUS credit card file including payment card information. If users have to manually perform data processing by entering credit card information on a portal, it is a time consuming process and has a risk of manual error and exposing information to a user. For example, manual entry of card information may not be compliant with payment card industry (PCI) standards, when unencrypted payment card information is present in a file and exposed to users. Manual processing may be inefficient, increase the risk of errors, miss information in a file that needs to be reviewed, miss validation of data, etc.

In various implementations, and end to end automated solution may comply with PCI guidelines, encrypt data to avoid exposure, secure a file during the end to end processing, automate the workflow, validate data to improve accuracy, mark error records to be skipped for review (which may be returned to an external vendor for validation), etc.

Example embodiments may be scalable and reusable for any type of secure file, such as financial related transactions over email, phone, etc. An example embodiment is implemented for PARCM users (such as administrators of a pharmaceutical or healthcare provider like ACCREDO), but may be used in any suitable environments.

In various implementations, an encryption—decryption method is used to make a file secure. An external vendor (such as an external database or server that stores encrypted files and transmits files to systems such as those described herein), may encrypt a file and load it to a secure location such as an SFTP drive. Users may not have keys to decrypt the file and see the records.

An application server drive may be connected to an SFTP folder using authentication credentials, to access the encrypted file. The encrypted file may then be decrypted by the system, such as by a Linux-based Cron job. The Cron job may use certificates to decrypt the file, and put the decrypted file in a folder to be accessed by an application file listener.

The application file listener may then access the decrypted file, parse the individual records, and perform data validation for the record data, such as payment card data validation. The record data is then transferred to a securely connected system for further processing if validation is successful (or may be sent back to the external vendor for review/confirmation if the validation is not successful). After processing the file, the application file listener may generate a report of the processing, and delete the decrypted file (e.g., to avoid any security glitches such as an unauthorized entity accessing the decrypted file information in the future).

After validation, the record data may be transferred to an external system (such as a payment gateway to process payment) with authentication. The record data may be sent using any suitable transfer protocol, such as a RESTful application programing interface (REST API).

Figure 8:
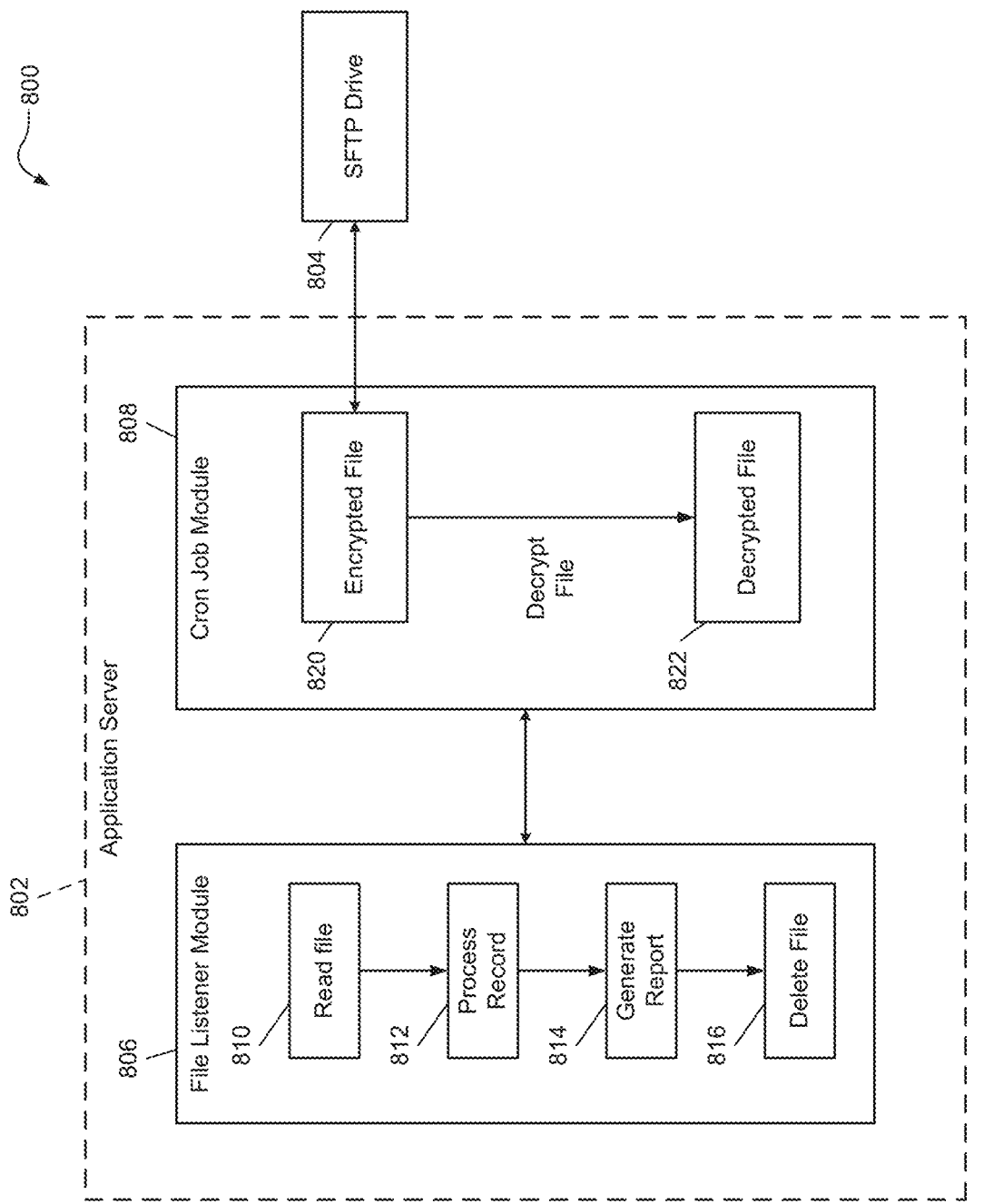
FIG. 8 is a functional block diagram of a system for processing encrypted files.

FIG. 8 is a functional block diagram of a system 800 for processing encrypted files. As shown in FIG. 8, an application server 802 includes a file listener module 806, and a Cron job module 808. The Cron job module 808 is configured to access an encrypted file 820 from an SFTP drive 804.

For example, an external vendor may supply an encrypted file including one or more records to an SFTP drive for secure storage. The Cron job module 808 then accesses the encrypted file 820, and decrypts the accessed file to create a decrypted file 822.

In various implementations, the Cron job module 808 may decrypt the file using any suitable decryption method, such as certificates, etc. The encrypted file 820 may use any suitable form of encryption, such as UNIX-based pretty good privacy (PGP) decryption. The Cron job module 808 may perform batch processing to decrypt one or more encrypted files.

The file listener module 806 is configured to listen, monitor, etc. for files decrypted by the Cron job module 808. For example, the Cron job module 808 may store the decrypted file 822 in a folder, and the file listener application may access the decrypted file 822 from the folder.

At 810, the file listener module 806 reads the decrypted file 822, and then processes the decrypted file 822 at 812. For example, the file listener module 806 may parse one or more record of the decrypted file 822 to obtain, e.g., payment card information, etc.

At 814, the file listener module 806 generates a report. The report may include details of the processing of the decrypted file 822, such as which records were parsed/processed, whether processing was successfully validated, etc. The file listener module 806 then deletes the decrypted file 822 at 816 (e.g., so unauthorized entities do not gain access to the decrypted records in the future, etc.).

Any records that are not successfully validated may be returned to an external vendor for review/confirmation (e.g., to determine if there are any errors in the external vendor's records). For example, if there is a failure to validate a record, an identifier of the record may be stored and sent back to the external vendor for correction. The external vendor may then correct the error and provide another fixed encrypted file.

Figure 9:
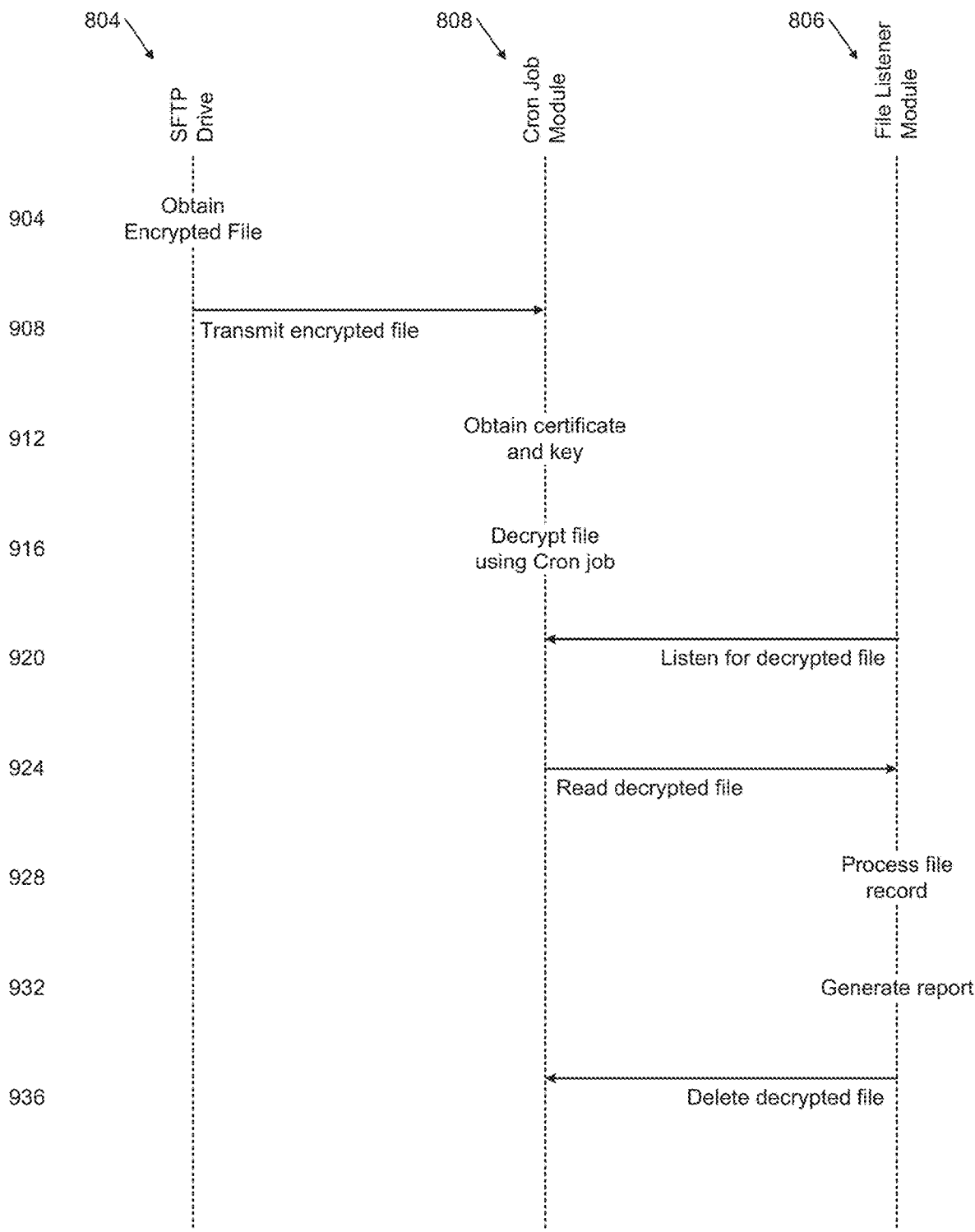
FIG. 9 is a message sequence chart illustrating example interactions between components of the system of FIG. 8.

FIG. 9 is a message sequence chart illustrating example interactions between components of the system of FIG. 8. At line 904, the SFTP drive 804 obtains an encrypted file, such as obtaining the encrypted file 820 of FIG. 8 from an external vendor.

At line 908, the SFTP drive 804 transmits the encrypted file to the Cron job module 808. The Cron job module 808 then obtains a certificate and key for decrypting the file at line 912, and proceeds with decrypting the file using a Cron job decryption process at line 916.

At line 920, the file listener module 806 listens for the decrypted file. The file listener module 806 then reads the decrypted file at line 924, and processes records of the decrypted file at line 928 (such as by parsing payment card records of the decrypted file).

The file listener module 806 generates a report of the processing of the file at line 932. At line 936, the file listener module deletes the decrypted file, which may prevent unauthorized users from gaining access to the records of the decrypted file in the future.

In various implementations, a UNIX based PGP encryption method may be used to encrypt and decrypt the files. For example, a UNIX based Cron job may be used to decrypt the files using certificates and a key. In some example embodiments, file processing may be performed using, e.g., a PEGA BPM tool, such as example systems described herein.

A file listener application may read the file and extract individual records, while validation logic checks the file and data accuracy. The system may interact with services to transfer the data securely and capture status. A report may be generated to see the file processing status.

In various implementations, an end to end system may automatically process thousands or more records periodically, such as 58,000 or more credit cards processed in four months, eliminating 2900 or more hours of manual work. 150,000 or more records may be eliminated, avoiding a waste of 7500 hours or more of manual work.

In some example embodiments, card numbers may be encrypted for each system. A file may be encrypted in SFTP. Data may be stored using, e.g., PEGA default encryption as a BLOB. Different environment servers may use different servers to avoid file and data conflicts.

Complete file and card information processing may be implemented, to inhibit user data from being modified, or changing a meaning of commands and queries. A user may not be able to see data and modify it during pre-processing or post-processing. Data type restrictions may be applied.

Strong cryptographic algorithms and keys may be applied, such as PGP encryption and decryption using a public and private key. Sensitive communications may be authenticated, and a shared file location may be used to hold files. For example, a Linux based PGP encryption technique may be used to decrypt a file, BLOB encryption may be used to hold data in queue, and OAuth authentication may be used to securely connect to a service.

Error handling may be established to record failures, where the error handling does not disclose PCI information. Data may be secure during logging, monitoring and error handling. Cross-site request forgery may be used where the application does not rely on user entered credentials. The file may be secured using a secure drive, and outbound services are secure and authenticated by OAuth.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer system comprising:
a database including memory hardware configured to store a first rule schema, a second rule schema and a data schema, the first rule schema configured to store a compiled code base, the second rule schema configured to store the compiled code base, and the data schema configured to store transactional data;
a user production environment including processor hardware and a user interface configured to allow users to perform application operations;
a developer non-production environment including processor hardware configured to facilitate developer deployment operations; and
processor hardware configured to execute instructions to
point the user production environment to the first rule schema,
point the developer non-production environment to the second rule schema,
point the user production environment and the developer non-production environment to the data schema,
update the second rule schema according to updates received via the developer non-production environment, and
in response to validation of the updates to the second rule schema,
change the user production environment to point to the updated second rule schema by modifying an extensible markup language (XML) configuration file which previously linked the user production environment to the first rule schema to instead point the user production environment to the second rule schema,
point the developer non-production environment to the first rule schema, and
synchronize the first rule schema to the second rule schema.

2. The computer system of claim 1, wherein the processor hardware is configured to:
perform an update check to determine whether the developer deployment operations have finished updating the second rule schema; and
perform a validation check in response to a determination that the developer deployment has finished updating the second rule schema.

3. The computer system of claim 1, wherein the processor hardware is configured to modify the second rule schema based on the received updates, without modifying the first rule schema.

4. The computer system of claim 3, wherein the processor hardware is configured to, in response to validation of the updates to the second rule schema, generate a third rule schema which is a copy of the updated second rule schema, for further development of the third rule schema by the developer non-production environment.

5. The computer system of claim 1, wherein the database, the user production environment and the developer non-production environment comprise a PEGA business process management (BPM) system.

6. The computer system of claim 5, wherein:
   the first rule schema and the second rule schema comprise a segregated split schema of the BPM system; and
   the user production environment and the developer non-production environment each point to the same data schema storing the transactional data.

7. The computer system of claim 1, wherein the first rule schema, the second rule schema and the data schema are stored in a same ORACLE cluster of the database.

8. The computer system of claim 1, further comprising:
   a first load balancer connected between the user interface and the user production environment; and
   a second load balancer connected between a developer application interface and the developer non-production environment.

9. The computer system of claim 1, wherein:
   the user production environment includes a first web user node, a first batch node and a first stream node; and
   the developer non-production environment includes a second web user node, a second batch node and a second stream node.

* * * * *